(12) United States Patent
Newkirk et al.

(10) Patent No.: US 7,008,543 B2
(45) Date of Patent: Mar. 7, 2006

(54) USE OF CHLORINE DIOXIDE AND OZONE FOR CONTROL OF DISINFECTION BY-PRODUCTS IN WATER SUPPLIES

(75) Inventors: Dale Darrow Newkirk, Walnut Creek, CA (US); Xuejun Zhou, Fremont, CA (US); Jeffrey John Neemann, Shawnee, KS (US)

(73) Assignee: Contra Costa Water District, Concord, CA (US)

( * ) Notice: Subject to any disclaimer, the term of this patent is extended or adjusted under 35 U.S.C. 154(b) by 0 days.

(21) Appl. No.: 10/411,852

(22) Filed: Apr. 14, 2003

(65) Prior Publication Data

US 2004/0200779 A1 Oct. 14, 2004

(51) Int. Cl.
*C02F 1/52* (2006.01)

(52) U.S. Cl. ............... 210/667; 210/668; 210/694; 210/721; 210/725; 210/727; 210/752; 210/754; 210/760; 210/764

(58) Field of Classification Search ........... 210/668, 210/721, 724, 725, 752, 754, 760, 764, 667, 210/694, 727
See application file for complete search history.

(56) References Cited

U.S. PATENT DOCUMENTS

| | | | |
|---|---|---|---|
| 4,693,832 A | | 9/1987 | Hurst |
| 4,915,955 A | | 4/1990 | Gomori |
| 5,141,722 A | | 8/1992 | Nagashima |
| 5,236,595 A | * | 8/1993 | Wang et al. ............ 210/669 |
| 5,292,410 A | | 3/1994 | Sweeney |
| 5,314,629 A | * | 5/1994 | Griese et al. ........... 210/754 |
| 5,609,766 A | * | 3/1997 | Schneider et al. ........ 210/662 |
| 5,618,440 A | * | 4/1997 | Mason .................. 210/716 |
| 5,698,095 A | | 12/1997 | Kami |
| 5,853,579 A | | 12/1998 | Rummler et al. |
| 6,602,426 B1 | * | 8/2003 | Hulsey et al. ........... 210/754 |
| 6,716,534 B1 | * | 4/2004 | Moore et al. ........... 428/447 |
| 2001/0050258 A1 | | 12/2001 | Gargas |
| 2001/0052502 A1 | | 12/2001 | Gargas |

FOREIGN PATENT DOCUMENTS

| | | |
|---|---|---|
| ES | 2.010.574 | 11/1989 |
| GB | 2.239.452 A | 3/1991 |
| RU | 2.122.982 | 12/1998 |
| RU | 2.142.430 | 12/1999 |

OTHER PUBLICATIONS

Nicoson, Jeffrey S., Kinetics and Mechanism of the Ozone/Bromite and Ozone Chlorite Reactions, Inorganic Chemistry, vol. 41, No. 11, 2002, pp. 2975-2980.

Neemann, Jeff, Combining Chlorine Dioxide and Ozone to meet Multiple Treatment Goals, International Ozone Conference, Raleigh, NC, May 2002.

* cited by examiner

*Primary Examiner*—Peter A. Hruskoci
(74) *Attorney, Agent, or Firm*—Harry A. Pacini

(57) ABSTRACT

A method of oxidation or pathogen inactivation in water supplies using the combination of treatments of chlorine dioxide and ozone in the sequential steps prior to filtration and distribution. Results indicate that the addition of chlorine dioxide before prezonation reduces the bromate formation and chlorine dioxide can be substituted for preoxidation with ozone, while maintaining the enhanced filtration effects observed from the presence of a preoxidant. A majority of the chlorite formed from reactions of chlorine dioxide with constituents in raw water are converted to chlorate by the following ozonation step.

6 Claims, 1 Drawing Sheet

USE OF CHLORINE DIOXIDE AND OZONE FOR CONTROL OF DISINFECTION BY-PRODUCTS IN WATER SUPPLIES

BACKGROUND OF THE INVENTION

1. Field of the Invention

This invention relates to the use of the combination of chlorine dioxide and ozone for preoxidation or pathogen inactivation in purification of water supplies, such as municipal water supplies, which allows an overall decrease in the ozone dosage. A beneficial decrease in the bromate formation was observed after ozonation. An on-site energy consumption reduction was also observed due to reduced ozone generation.

The discovery that chlorine dioxide application before ozonation can reduce the bromate formation in the ozonation process was unexpected. This has significant benefit to municipal water supplies. It was also found that the addition of sodium chlorite in place of chlorine dioxide before ozonation achieved similar results on bromate formation reduction.

2. Description of Related Art

Use of chemicals in drinking water treatment is well established as an effective means for pathogen inactivation and disinfection. Hitherto, many chemical compounds have been reported for use in water reservoirs. These chemicals include various quaternary ammonium salts, copper salts, and oxidants, such as the classic chlorine sources oxidizing disinfectants, chlorine and hypochlorite, bromine sources, ozone or peroxy compounds, e.g. hydrogen peroxide and potassium peroxymonosulfate.

The use of these chemicals carries with it occasional disadvantages while being effective as bactericides and disinfectants. For example, chlorine at improper pH and concentration levels produces unfavorable tastes and odors, and irritation. The halogen family of elements has been closely linked to the chemical disinfection of water. Although many alternative chemical disinfectants have been evaluated (e.g. ozone and hydrogen peroxide), chlorine in the elemental or hypochlorite salt forms continue to perform a dominant role in the water treatment field.

Chlorine has a sustained popularity in this field for many years due to two main factors. The effective bactericidal action of free chlorine in water even at relatively low levels and the excellent equipment developed for use and handling of chlorine has added to its popularity of use. Most of the present day potable water treatment plants use some form of chlorine for disinfection and rely upon the maintenance of a residual of free available chlorine concentration in the finished water to insure ultimate delivery of a safe and sanitary product throughout the distribution system. The inherent reactivity of free available chlorine that provides its strong bactericidal action is exhibited in other ways, notably in its instability and gradual loss from aqueous solutions and its chemical reactivity with a wide variety of both inorganic and organic constituents found in raw water sources. As a result, the residual free available chlorine concentration in the finished water released from a modern treatment plant is generally maintained at a level of between about 1.0 and about 3.0 mg./liter, with the particular value chosen dependent upon the expected rate of disappearance and residence times involved in the distribution system. The levels required will vary with water quality, which is subject to weather and seasonal changes due to the effects of temperature, sunlight, etc. on reaction rates, solubilities, etc.

The results and performance of this invention shows the efficacy of $ClO_2$ preoxidation at a treatment facility that uses ozone as an oxidant for many beneficial results, e.g. taste and odor control, or for achieving acceptable concentration*time (CT) values. The results will benefit numerous drinking water facilities that have either installed or plan to install ozonation facilities to provide maximum protection against waterborne pathogens such as *Giardia* and *Cryptosporidium* while maintaining lower levels of bromate in the treated water to meet the drinking water standards. The problem most frequently associated with ozonation is the increase in biodegradable organic matter that occurs when the ozone oxidizes naturally occurring organic matter, thus creating a need for a biologically active filter. Another problem with ozonation is that of bromate ($BrO_3^-$) formation from the oxidation of the bromide ion ($Br^-$) in the source water. While pH adjustment and reducing the ozone ($O_3$) dosages are effective in reducing bromate formation, the ozone demand of the water prior to ozonation must still be met before an ozone residual high enough to achieve concentration*time values can be attained. Bromate ion formation occurs faster than pathogen inactivation. Bromate ion formation is a function of the ozone dosage, and increases with increasing ozone dosages. Coastal areas, where raw water bromide levels tend to be high, exhibit this problem. There are other methods, such as reducing pH when ozonating or adding ammonia before ozonation, that maybe effective for bromate formation reduction. However, these methods have their own limitations.

BRIEF DESCRIPTION OF THE DRAWING

A more complete appreciation of the invention and many of the attendant advantages thereof will become readily apparent from the following detailed description, particularly when considered in conjunction with the drawing in which.

DETAILED DESCRIPTION OF THE INVENTION

Figure 1:
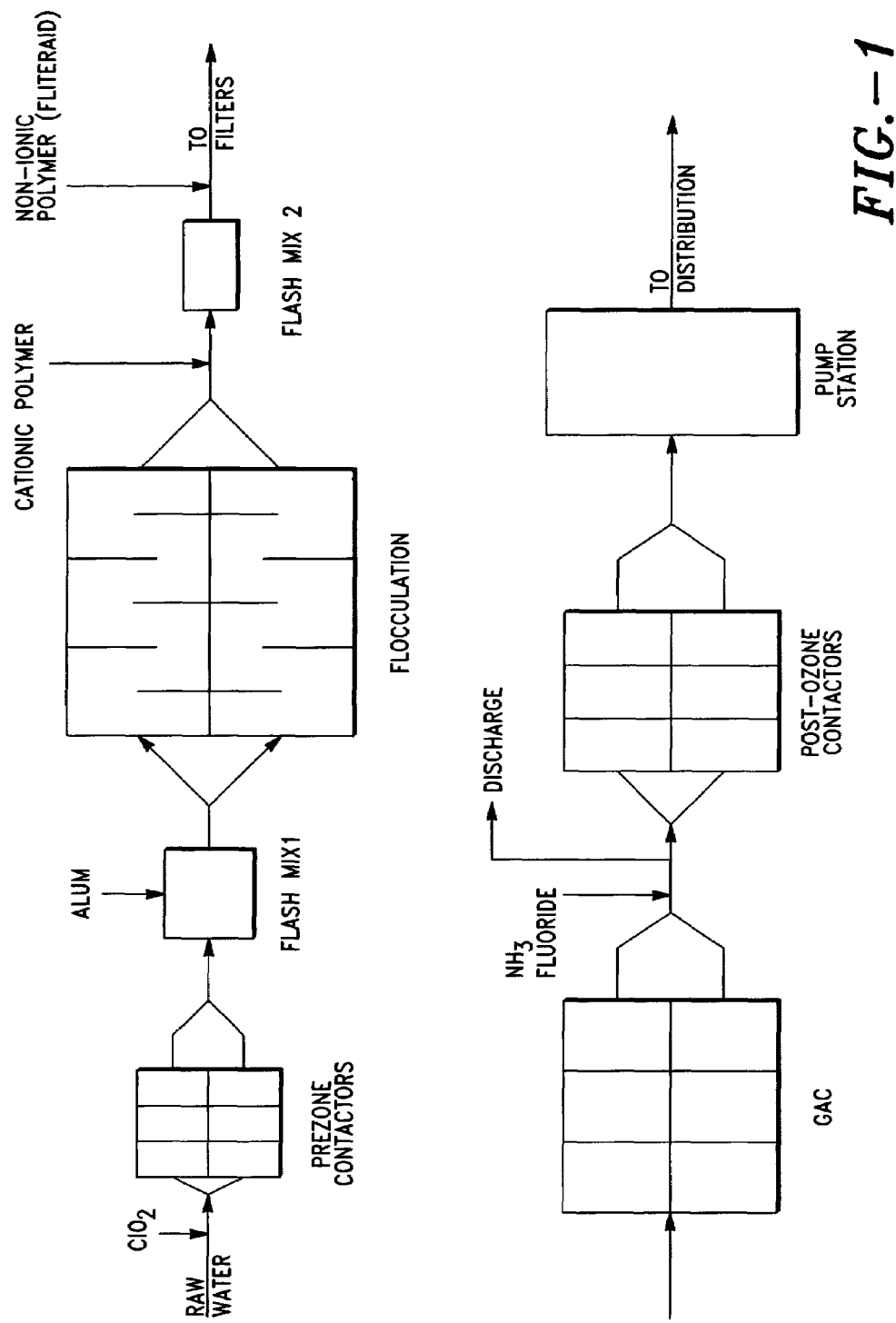
FIG. 1 is an overall schematic of a water treatment system of the present invention illustrated in the context of a municipal source water treatment plant.

Now referring to the drawing, wherein like reference designates identical or corresponding parts throughout the view and this description, an initial appreciation of the present invention will become readily apparent from FIG. 1. The system as shown in FIG. 1 can be utilized for handling and treating raw water for drinking water supply from a variety of sources. In the context of large water supplies, such as municipal drinking water treatment and delivery, it is understood that the raw water source used in this description is provided merely as an example. Since the system and process of the present invention can be advantageously used in a wide variety of environments, which may have different sources of water containing various pathogens for different populations.

The present invention concerns a water purification system comprising in sequence preoxidation of the source water with chlorine dioxide and subsequent treatment of the treated water source with ozone. Applying chlorine dioxide to raw water helped to reduce the overall amount of ozone demand ultimately required in the overall process of water purification. In this illustration, ozone was used for taste and odor control, filtration enhancement, and after filtration ozone was used to accomplish primary disinfection of treated water. Filtration is capable of removing some of the bromate formed in appropriate downstream procedures. Activated carbons, especially grained or powdered activated carbons, and fused alumina oxides with a grain structure have shown to be effective. Filtration with activated carbon has the disadvantage of removing ozone, also, where it is converted to oxygen. A filtration with alumina oxide has shown to be preferred. This filtration retains formed bromate by adsorbing it onto the surfaces, but in addition, the ozone is kept in the water. By using activated carbon and alumina oxide filters, the organic precursors are adsorptively retained, which are formed during the ozone treatment. Hence, as noted previously, ozone was used for achieving pathogen inactivation.

Chlorine dioxide ($ClO_2$) exists as a volatile, energetic free radical and is very reactive. It is explosive at 5.8 psi (40 pKa) or above atmospheric pressure at 6 psig (41 pKa). For that reason, it cannot be compressed or stored and must be generated on site. Solutions generated for water treatment are generally in the range of 0.1 mg/L to 5.0 mg/L. If the aqueous concentration exceeds 10 mg/L an explosion can occur. Chlorine dioxide does not hydrolyze in water, but remains as a highly soluble gas when the water temperature is greater than 11° C. and the pH is between 2 and 10. Chlorine dioxide solutions are greenish-yellow and smell strongly of chlorine. Aqueous solutions must be protected from light to prevent photolysis resulting in degradation to the Chlorate ion ($ClO_3^-$). The significance of the properties of chlorine dioxide for water treatment is that because of its volatility chlorine dioxide should be applied with a minimum of agitation (e.g. in rapid mixers) and exposure to light.

Treatment plants using chlorine dioxide typically generate it using sodium chlorite, either in the solid form or a 25 percent solution. Sodium chlorite is reacted with either chlorine gas, hypochlorous acid, or hydrochloric acid. In the present process and invention the chlorine dioxide system used was a two chemical generator using liquid sodium chlorite and gaseous chlorine, according to the following formula,

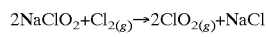

$$2NaClO_2 + Cl_{2(g)} \rightarrow 2ClO_{2(g)} + NaCl$$

Another method to generate chlorine dioxide is using a sodium hypochlorite solution and applying an electric current to the solution.

The schematic diagram in FIG. 1 shows the general schematic of a generator system and the chlorine dioxide feed point. Chlorine dioxide is added to the raw water pipeline and allowed to react in the pipeline and the first stage of the ozone contactor to provide sufficient reaction/decay time for the chlorine dioxide in the system. The chlorine dioxide dosage is automatically controlled with a control valve assembly.

By application of chlorine dioxide to raw water a reduction in the overall ozone dosage required for water treatment and pathogen inactivation was realized. Hence overall on-site energy consumption is substantially reduced by need for reduced ozone generation, while still maintaining the filtration enhancements of pre-ozonation. The specific objectives achieved by chlorine dioxide preoxidation according to this invention include reduced ozone demand, and reduced bromate formation compared to the use of no chlorine dioxide added, disregarding ozone dose reduction or no reduction.

The treatment of the present invention can be performed with a batch or in a continuous procedure. When treating in a continuous process, an efficient duration of the retention time should be used.

For testing and experimental development of the process of this invention the following system was used. The testing was divided into three phases that act to evaluate the demand studies and carry the design into long-term full scale operation of chlorine dioxide in combination with ozone in the inactivation of pathogens in raw water supplies. The first phase was a screening of different chlorine dioxide and ozone dose combinations. Samples were collected only at the preozone contactor effluent. Selected dosage combinations of chlorine dioxide and ozone were evaluated with short term tests lasting two days during the second phase. The third phase of testing used three-week long term test to evaluate the objectives and to evaluate potential problems which might associated with using a selected combination of chlorine dioxide and ozone doses.

The tests were conducted at a direct filtration water treatment plant, which normally used preozonation for pre-oxidation for taste and odor control and post-ozone treatment for primary disinfection. This system was used for testing the use of multiple oxidants for treating raw water. This is illustrated in FIG. 1.

There were two pre-ozone contactors in parallel, each contactor having three cells in which ozone can be added to each cell. Preozonation is primarily used for taste and odor control and as a coagulant aid to enhance particulate removal in the filters, dosage was varied typically from 1.0 to 2.5 mg/L (milligrams per Liter). Alum was used as a coagulant and flocculant and added in two parallel hydraulic flocculation basins. The plant had six deep-bed granular activated carbon (GAC) filters with 80 inches of granular activated carbon and 40 inches of sand. The design load rate for the filters is 6 gallons per minute per square foot (gpm/sf). The two post-ozone contactors are similar to the pre-ozone contactors, with 3 cells in each contactor for ozone addition. Post-ozone addition is used to achieve primary disinfection. In the system chloramines are formed after post-ozone treatment and are used as a secondary disinfectant.

As mentioned above, testing was first carried out using different chlorine dioxide and ozone dosage combinations. The initial tests were four hour tests, and samples were collected at the preozone contactor effluent. This procedure allowed for a quick evaluation of viable dosage combinations based on the ozone demand, bromate formation, and chlorate formation results. Acceptable selected dosage combinations were then evaluated in the second phase of testing. The second phase of testing lasted two days and was designed to evaluate the previous mentioned objectives of the system, as well as evaluate the effect of substituting chlorine dioxide for ozone might have on the filter performance and effluent water quality.

Three operating scenarios were chosen for preoxidation during the long-term or third phase of testing to further evaluate the objectives of the system and to investigate potential problems that may arise with using a combination of chlorine dioxide and ozone. The three scenarios consisted of testing using solely 1.5 mg/L of chlorine dioxide without preozonation; the combination of 1.0 mg/L of chlorine dioxide and 0.5 mg/L of ozone; and solely 1.0 mg/L of ozone. Each condition was evaluated for three weeks with one replicate to provide about 18 weeks of full-scale operation. This is summarized in (Table 1).

TABLE 1

| Testing Matrix - Long Term | | | |
| --- | --- | --- | --- |
| Phase | Duration | $ClO_3$ (mg/L) | $O_3$ (mg/L) |
| 3A | 20 days | 1.5 | — |
| 3B | 21 days | 1.0 | 0.5 |
| 3C | 22 days | — | 1.0 |
| 3D | 19 days | 1.5 | — |

TABLE 1-continued

Testing Matrix - Long Term

| Phase | Duration | ClO$_3$ (mg/L) | O$_3$ (mg/L) |
|---|---|---|---|
| 3E | 19 days | 1.0 | 0.5 |
| 3F | 17 days | — | 1.0 |

When chlorine dioxide was applied during the testing period, a portion of the preozonation contactor (cell one) was used to provide additional chlorine dioxide contact time, while adding ozone in cell two of the three-cell preozonation contactor. Therefore, during the testing, ozone, was added in cell 2 with or without chlorine dioxide. The target chlorine dioxide dosage was selected low enough that no residual remains as water entered the second cell of the contactor where ozone was added. Care was taken to ensure that relocation of the ozone addition point in the preozonation contact chamber did not compromise the treatment. No negative impacts were observed when chlorine dioxide was added. To the contrary, the addition of chlorine dioxide was been shown to improve coagulation, flocculation and settling.

These tests represent full-scale operation of the test plant with approximate three week "test runs". The test conditions are given above and in Table 1. When chlorine dioxide was used alone or in combination with ozone as a preoxidant, bromate formation was usually reduced to or below the detection limit of 2 ppb. The testing also showed that chlorine dioxide preoxidation could essentially and effectively replace preozone treatment without substantially affecting the filtered water quality. Sampling for chlorite and chlorate showed that a majority of the chlorite that was formed from the addition of chlorine dioxide was converted to chlorate by the preozone treatment, some chlorite removal by the granular activated carbon filters, and the post-ozone treatment.

Bromate formation and concentration was monitored two times per week at the pre-ozone contactor and the post-ozone contactor effluent to determine the impacts of chlorine dioxide on bromate formation. The results showed preoxidation with chlorine dioxide alone, or in combination with ozone can significantly reduce bromate formation to a level that was at or below the detection limit. The test carried out with ozone alone resulted in average bromate formation of 5.6 ppb during Phase 3C and 3.3 ppb during Phase 3F. A summary of the test results, average raw water bromide concentration, chlorine dioxide dose, pre-ozone dose post-ozone CT, and bromate concentration after pre- and post-ozone treatments are presented in Table 2.

As shown in Table 2, the test carried out with chlorine dioxide usually resulted in bromate concentrations that were below the detection limit. The averages can be seen as zero or very close to zero. The test carried out with ozone alone had the highest average bromate concentrations after the post-ozone contactor. The bromate formation after the pre-ozone contactor during Phase 3F (ozone alone) was substantially lower than Phase 3C (ozone alone) and was comparable to the test performed with chlorine dioxide. One explanation for the decrease in bromate formation is the total organic carbon (TOC) was higher during the Phase 3E test period and all of Phase 3F. Increases in natural organic matter (NOM) have been shown to decrease the bromate formation at a constant ozone dose.

Chlorite and chlorate formation were monitored through the plant process twice a week during the long-term testing. The results indicated that all of the chlorite that was formed was removed or converted to chlorate by the pre-ozone, granular activated carbon filters, and the post-ozone. The average chlorite and chlorate concentrations during Phase 3A, when chlorine dioxide only was added, showed results very similar to Phase 3D. Similarly, results for Phase 3B, when a combination of chlorine dioxide and ozone were used, were very close to Phase 3E. Essentially little or no chlorite remained at the end of the treatment system.

Chlorite concentration is of concern with most municipal utilities because a maximum concentration level (MCL) of 1.0 mg/L exists and there is no existing MCL for chlorate. When chlorine dioxide alone is being used as a preoxidant, the granular activated carbon filters remove slightly more than half of the chlorite with little change in the chlorate concentration. The post-ozone contactor then converted the remaining chlorite with little change in the chlorate concentration. The post-ozone contactor then converted the remaining chlorite to chlorate. When the combination of chlorine dioxide and ozone is used for preoxidation, the pre-ozone converts a little more than half of the chlorite to chlorate, then the granular activated carbon filters (GAC) remove the majority of the remaining chlorite.

Investigation of Bromate Formation and Mitigation

The following tests investigated bromate formation at two ozone doses (2.0 and 4.0 mg/L) and using multiple mitigation techniques such as preoxidation with ClO$_2$, sodium chlorite addition, pH adjustment, and ammonia addition. The addition of sodium chlorite as the source of chlorite provided an opportunity to evaluate whether ozone was reacting with chlorite and thereby limiting bromate formation or whether ClO$_2$ is the critical component, which in some way interferes with bromate formation. A summary of

TABLE 2

Impact of Preoxidation on Post-ozone Dosage and Bromate Formation

| Phase | Avg. Raw Water Bromide (ppb) | ClO$_3$ (mg/L) | O$_3$ (mg/L) | Avg. Post-O$_3$ Dose (mg/L) | Avg. Post-O$_3$ CT (mg*min/L) | Avg.* Bromate after Pre-O$_3$ (ppb) | Avg.* Bromate after Post-O$_3$ (ppb) |
|---|---|---|---|---|---|---|---|
| 3A | 265 | 1.5 | — | 1.22 | 4.26 | 0 | 0.2 |
| 3B | 257 | 1.0 | 0.5 | 0.78 | 3.99 | 0 | 0.8 |
| 3C | 305 | — | 1.0 | 0.54 | 3.94 | 4.8 | 5.6 |
| 3D | 343 | 1.5 | — | 1.53 | 4.97 | 0 | 0 |
| 3E | 316 | 1.0 | 0.5 | 1.16 | 5.16 | 0 | 0.5 |
| 3F | 255 | — | 1.0 | 1.13 | 5.14 | 0.3 | 3.3 |

*Samples below the detection limit were treated as zero.

the test conditions and results: ozone dosages, bromide, TOC, UV254, average bromate, average chlorite, and average chlorate concentrations is presented in TABLE 3.

the use of ozone alone resulted in bromate formation of about 25 ppb. The data also suggested that chlorite addition is as effective as $ClO_2$ preoxidation in reducing bromate

TABLE 3

Average Bromate, Chlorite, and Chlorate Formation During Mitigation Testing

| Condition | Ozone Dose (mg/L) | Bromide (ppb) | TOC (mg/L) | UV254 (1/cm) | Average Bromate (ppb) | Average Chlorite | | Average Chlorate | |
|---|---|---|---|---|---|---|---|---|---|
| | | | | | | Post $ClO_2$ (ppb) | Pre-Rapid Mix (ppb) | Post $ClO_2$ (ppb) | Pre-Rapid Mix (ppb) |
| Ozone only | 4 | 180 | 2.1 | 0.095 | 60.3 | | | | |
| 0.5 mg/L $ClO_2$ | 4 | 180 | 2.1 | 0.095 | 62.3 | 290 | 0 | 100 | 400 |
| 1.0 mg/L $ClO_2$ | 4 | 160 | 2.0 | 0.085 | 57.7 | 510 | 0 | 100 | 770 |
| 0.7 mg/L Chlorite | 4 | 180 | 2.0 | 0.085 | 51.3 | 700 | 0 | 40 | 720 |
| Ozone only | 2 | 160 | 2.0 | 0.085 | 24.7 | | | | |
| 0.5 mg/L $ClO_2$ | 2 | 180 | 2.1 | 0.095 | 14.3 | 300 | 0 | 70 | 370 |
| 1.0 mg/L $ClO_2$ | 2 | 180 | 2.1 | 0.095 | 5.2 | 510 | 0 | 130 | 720 |
| 0.7 mg/L Chlorite | 2 | 180 | 2.0 | 0.085 | 5.3* | 710* | 0* | 30* | 630* |
| pH 6.5 | 2 | 180 | 2.0 | 0.085 | 13.3 | | | | |
| pH 6.0 | 2 | 180 | 2.0 | 0.085 | 5.6 | | | | |
| 0.25 mg/L $NH_3$—N | 2 | 210 | 2.0 | 0.087 | 19.7 | | | | |
| 0.5 mg/L $NH_3$—N | 2 | 210 | 2.0 | 0.087 | 16.9 | | | | |

*Represents data from third sample, not the average of three samples

As shown in TABLE 3, when 2.0 mg/L of ozone alone was added, the bromate formation from the preozonation contactor averaged 24.7 ppb, well in excess of the MCL. When $ClO_2$ was added without changing the ozone dose, the bromate formation was reduced substantially. A $ClO_2$ dose of 1.0 mg/L reduced the average bromate formation to 5.2 ppb, which is almost an 80 percent reduction in bromate formation when compared to no $ClO_2$ addition. When 0.7 mg/L of chlorite was added ahead of the preozonation contactor, the bromate formation was reduced to 5.3 ppb, which is very similar to the effect of 1.0 mg/L of $ClO_2$. Therefore, the data suggest that the chlorite formed after $ClO_2$ addition, and not the $ClO_2$ itself, plays an important role in reducing bromate formation.

Testing was also conducted using pH adjustment and ammonia addition for bromate mitigation. The data showed that pH adjustment was very effective. Reducing the pH to 6.5 lowered the average bromate formation to 13.3 ppb, and reducing the pH to 6.0 lowered the average bromate formation to 5.6 ppb. Ammonia addition was effective, but to a lesser extent—an ammonia dosage of 0.5 mg/L reduced bromate formation only to 16.9 ppb.

The testing done with an ozone dose of 4.0 mg/L showed very high bromate formation. When ozone alone was added, the average bromate formation was 60.3 ppb, well above the MCL. When $ClO_2$ or chlorite was added to the raw water before adding ozone, the bromate formation was decreased, but not to the extent observed at lower ozone dosages. The 1.0 mg/L $ClO_2$ dose that reduced bromate formation by 80 percent at an ozone dose of 2.0 mg/L, reduced bromate formation only marginally. A chlorite dose of 0.7 mg/L resulted in the lowest bromate formation, but only about a 15 percent lower than with ozone alone. Although $ClO_2$ preoxidation was less effective, an ozone dose of 4.0 mg/L is higher than the typical dose used at the water treatment plant and the results of a 2.0 mg/L ozone dose are more applicable.

Preoxidation with $ClO_2$ and pH adjustment appear to be among the best methods of reducing the bromate formation at the water treatment plant. Both were very effective in reducing the bromate formation below the MCL, even when formation. However, adding sodium chlorite will not maintain the improved filtration effects associated with $ClO_2$ preoxidation that were observed during this test.

Conclusions from the above bromate mitigation testing include the following:

Preoxidation with as little as 0.25 mg/L of $ClO_2$ before preozonation can substantially reduce the bromate formation.

Chlorite addition in the form of sodium chlorite can reduce bromate formation equal to $ClO_2$ addition, which demonstrates that the chlorite ion plays an important role in reducing the bromate formation. If sodium chlorite is substituted for $ClO_2$, other benefits of preoxidation, especially improved filter performance, will not be realized.

Reducing the raw-water to pH 6.0–6.5 prior to preozonation can reduce bromate formation, almost as well as preoxidation with chlorine dioxide; the benefits are greater at the lower pH. After the water is set to pH 6.0–6.5, prior to distribution, the pH of the treated water is set to the neutral region.

Ammonia addition to raw water at dosages of 0.25 mg/L and 0.5 mg/L can reduce bromate formation but not to the same extent as either chlorine dioxide preoxidation or raw-water pH reduction to pH 6.0.

Therefore, the conclusions from the testing show at a constant ozone dose, preoxidation with chlorine dioxide reduced the bromate formation when compared to no chlorine dioxide addition. Also, preoxidation with chlorine dioxide can be partially or fully substituted for ozone and maintain similar enhanced filtration effects of a preoxidant. All the chlorite formed from reactions of the chlorine dioxide with raw water constituents was either removed by the granular activated carbon (GAC) filters or converted to chlorate by ozone.

Clearly, numerous modifications and variations of the present invention are possible in light of the above disclosure and teachings. It is therefore to be understood that within the scope of the appended claims, the invention may be practiced otherwise than as specifically described herein.

What is claimed is:

1. Method of oxidation or pathogen inactivation in a water supply system using chlorine dioxide and ozone to reduce bromate formation comprising the steps of
   1) pretreatment of the water supply with chlorine dioxide;
   2) ozone treatment in a pro-ozone contactor;
   3) passing the treated water through a flocculation basin followed by a filter bed;
   4) disinfecting the filtered water by passing through a post-ozone contactor prior to distribution to produce oxidation or pathogen inactivation, wherein an effective amount of chloride dioxide is added to said water supply to reduce bromate formation.

2. Process for the control of the formation of bromate during ozonation of bromide containing water comprising the steps of
   1) chlorine dioxide is introduced into said bromide containing water
   2) ozone is introduced into the water for a period of time in pre-ozone contactor;
   3) passing the treated water through a flocculation basin followed by a filter bed; and
   4) sufficient ozone is introduced into the filtered water in a post ozone contactor to produce oxidation, sterilization and pathogen inactivation wherein an effective amount of chlorine dioxide is added to said water to reduce bromate formation.

3. The process according to claim 2 including the step of coagulation with alum after the pre-ozone contactor.

4. The process according to claim 2 wherein during ozonation the pH is at a value of 6.5 to 6.0.

5. The process according to claim 4 wherein after ozonation the treated water is set to a pH value in the neutral region.

6. Process for the control of the formation of bromate during ozonation of bromide containing water to produce oxidation, sterilization and pathogen inactivation comprising the steps of:
   1) chlorine dioxide is introduced into said bromide containing water prior to ozone introduction;
   2) ozone is introduced into the water following the chlorine dioxide introduction in a pre-ozone contactor;
   3) coagulating the treated water with alum and passing the treated water through a flocculation basin followed by a granular activated carbon filter; and
   4) introduction of additional ozone into the filtered water in a post-ozone contactor prior to distribution to produce oxidation, sterilization and pathogen inactivation, wherein an effective amount of chlorine dioxide is added to the water to reduce bromate formation.

* * * * *